(12) United States Patent
Gupta et al.

(10) Patent No.: US 11,971,849 B2
(45) Date of Patent: Apr. 30, 2024

(54) MANAGING FLEET OF MULTI-TENANT LOGICAL DATABASES IN RELATIONAL DATABASE MANAGEMENT SYSTEM SERVERS

(71) Applicant: SAP SE, Walldorf (DE)

(72) Inventors: Abhik Gupta, Kolkata (IN); Nishtha Srivastava, Lucknow (IN); Vineet Singh, Delhi (IN)

(73) Assignee: SAP SE, Walldorf (DE)

( * ) Notice: Subject to any disclaimer, the term of this patent is extended or adjusted under 35 U.S.C. 154(b) by 21 days.

(21) Appl. No.: 17/677,450

(22) Filed: Feb. 22, 2022

(65) Prior Publication Data

US 2023/0267097 A1 Aug. 24, 2023

(51) Int. Cl.
G06F 16/11 (2019.01)
G06F 16/28 (2019.01)

(52) U.S. Cl.
CPC .......... *G06F 16/122* (2019.01); *G06F 16/284* (2019.01)

(58) Field of Classification Search
CPC .............................. G06F 16/122; G06F 16/284
USPC ........................................................ 707/825
See application file for complete search history.

(56) References Cited

U.S. PATENT DOCUMENTS

| | | | | |
|---|---|---|---|---|
| 2011/0029581 A1* | 2/2011 | Zhao | ................... | H04L 67/1014 707/812 |
| 2012/0287462 A1* | 11/2012 | Kimura | ................. | G06F 3/1259 358/1.15 |
| 2021/0096958 A1* | 4/2021 | Kumar | ................. | G06F 16/128 |

OTHER PUBLICATIONS

Oracle® Database Database Concepts, 19c E96138-06 Copyright @ 1993, 2021, Oracle and/or its affiliates. Primary Authors: Lance Ashdown, Donna Keesling, Tom Kyte, Joe McCormack, (hereafter "OraDBConcepts19c") (Year: 2021).*

* cited by examiner

*Primary Examiner* — Kuen S Lu
(74) *Attorney, Agent, or Firm* — Buckley, Maschoff & Talwalkar LLC

(57) ABSTRACT

According to some embodiments, methods and systems may manage a fleet of multi-tenant logical databases in Relational Database Management System ("RDBMS") servers for a cloud computing environment. The system may include a pool of physical RDBMS servers (e.g., Postgre-Structured Query Language ("SQL") servers) and a tenant-aware Application Programming Interface ("API") that is accessed by tenants. A computer processor of a database allocation engine may receive, from the tenant-aware API, a request to provision a logical database including a tenant identifier associated with a requesting tenant. The database allocation may then select an eligible physical RDBMS server in the pool of physical RDBMS servers and allocate a logical database for the requesting tenant via the selected physical RDBMS server (e.g., using the tenant identifier).

20 Claims, 14 Drawing Sheets

MANAGING FLEET OF MULTI-TENANT LOGICAL DATABASES IN RELATIONAL DATABASE MANAGEMENT SYSTEM SERVERS

BACKGROUND

An enterprise may utilize a cloud computing environment to let users perform tasks. For example, the enterprise might let various users execute an application via the cloud computing environment to process purchase orders, adjust human resources information, generate invoices, etc. With the advent of cloud technologies and the benefits of usage-based pricing for cost-effectiveness, organizations are rapidly transitioning workloads to such cloud infrastructures. Cloud infrastructure providers (and container orchestration technologies such as Kubernetes) offer tooling and orchestration for database service offerings in their technology catalogs.

Although cloud services offer real-world benefits related to license and usage-based monitoring, database instances often suffer from several disadvantages. For example, database instances may be associated with a substantial costs for physical resources (e.g., compute units, storage devices, and network bandwidth). Note that physical resources (virtualized and non-virtualized) may be especially costly in environments that need to cater to requirements of high availability and geo-physical distribution of workloads. Moreover, database instances may suffer from an under-utilization of resources. For example, physical resources might not be utilized to their highest potential as a result of miscalculated usage forecasts and/or the elastic scaling of resources. This may be especially relevant for database servers, where the actual size of stored data and utilization of compute units can be much lower than the size of physical resources. In addition, database instances may require complex and tedious continuous integration ("CI") and/or continuous deployment ("CD") setups. With increased scale of operations, CI systems (pipelines) tend to become overly demanding and complex (and often become sluggish and tedious to manage). Furthermore, improper cleanup finalization processes often lead to increased maintenance costs. Database instances may further be associated with high-maintenance scaling and day-2 operations. With the increased scale of resources, day-2 operations involving monitoring and disaster recovery processes can become cumbersome.

PostgreSQL is an open-source Relational Database Management System ("RDBMS") with support for top-level hierarchical structures called logical databases. A database is the topmost hierarchical structure for organizing SQL entities (tables, functions, etc.). Client connections to PostgreSQL servers specify the name of the logical database. Note that logical databases may be physically separated and isolated at the connection level.

Multi-tenancy is an architectural pattern where a shared set of physical resources is used to accommodate workloads (for multiple customers or tenants) without compromising logical isolation between the workloads. A multi-tenant system (e.g., for fifty tenants) is expected to ensure a near-complete degree of logical isolation with varying degrees of physical isolation and is usually tolerant towards co-tenant monopoly issues (otherwise known as the "noisy-neighbor problem").

The hierarchical and connection-isolated nature of PostgreSQL logical databases may work well with the tenant-driven system design required for multi-tenant architectures (e.g., with PostgreSQL as the backing RDBMS). It would therefore be desirable to provide an automated infrastructure-agnostic approach to manage fleets of tenant-oriented logical RDBMS databases across physical servers. Some embodiments may help solve the previously described limitations of running database instances.

SUMMARY

According to some embodiments, methods and systems may manage a fleet of multi-tenant logical databases in Relational Database Management System ("RDBMS") servers for a cloud computing environment (e.g., associated with a Software-as-a-Service or a Platform-as-a-Service). The system may include a pool of physical RDBMS servers (e.g., Postgre-Structured Query Language ("SQL") servers) and a tenant-aware Application Programming Interface ("API") that is accessed by tenants. A computer processor of a database allocation engine may receive, from the tenant-aware API, a request to provision a logical database including a tenant identifier associated with a requesting tenant. The database allocation may then select an eligible physical RDBMS server in the pool of physical RDBMS servers and allocate a logical database for the requesting tenant via the selected physical RDBMS server (e.g., using the tenant identifier).

Some embodiments comprise means for receiving, at a computer processor of a database allocation engine from a tenant-aware Application Programming Interface ("API") accessed by tenants, a request to provision a logical database including a tenant identifier associated with a requesting tenant; means for selecting an eligible physical RDBMS server from a pool of physical RDBMS servers; and means for allocating a logical database for the requesting tenant via the selected physical RDBMS server using the tenant identifier.

Some technical advantages of some embodiments disclosed herein are improved systems and methods to provide an automated infrastructure-agnostic approach to manage fleets of tenant-oriented logical RDBMS databases across physical servers.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
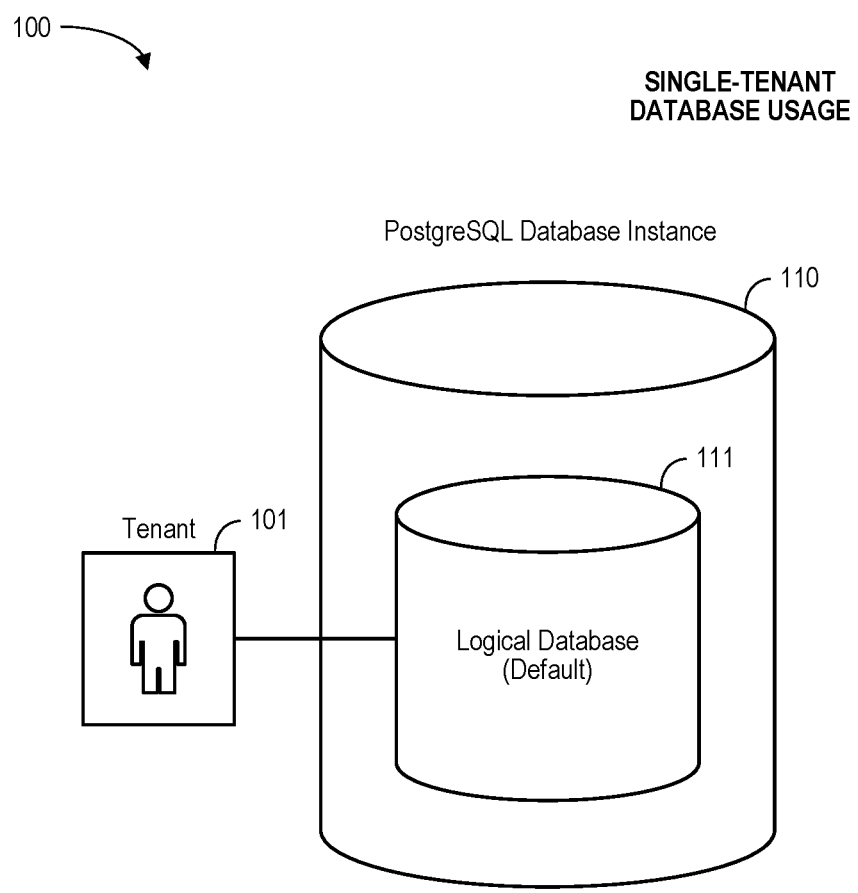
FIG. 1 illustrates single-tenant database usage.

FIG. 1 illustrates 100 single-tenant 101 database usage. In this example, a logical database 111 (e.g., a default database) is in a PostgreSQL database instance 110. Although PostgreSQL is used in some embodiments herein as an example, note that embodiments may be associated with other types of RDBMS systems. In FIG. 1, a single-tenant 101 PostgreSQL server is a dedicated installation of the PostgreSQL database engine using dedicated physical resources. The single-tenant 101 PostgreSQL database instance 110 may be owned and used by a single application. The application will typically connect to the default database in the server and uses database schemas for storing entities.

Figure 2:
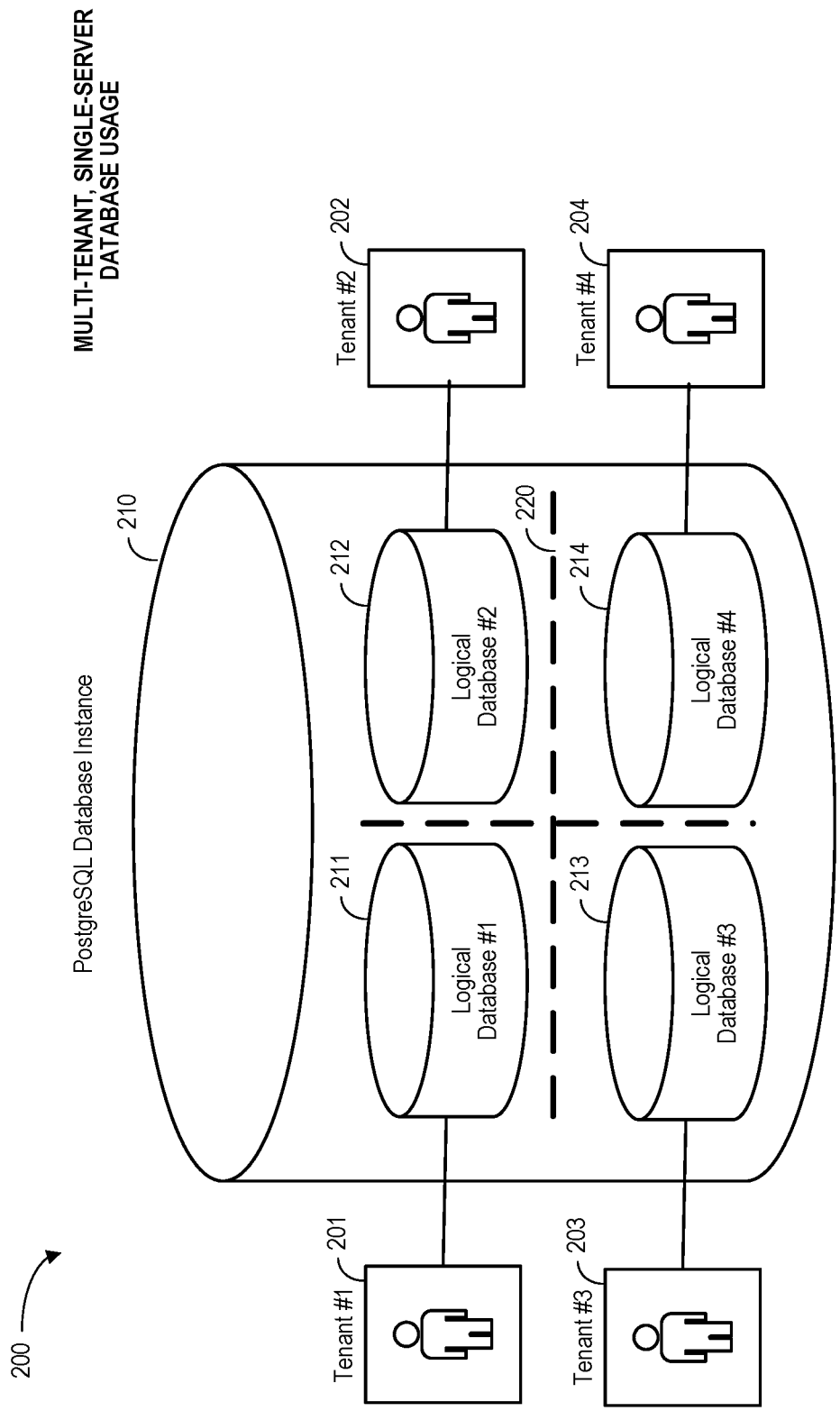
FIG. 2 illustrates multi-tenant, single-server database usage.

FIG. 2 illustrates 200 multi-tenant, single-server database usage. Here, four tenants 201, 202, 203, 204 (tenant #1 through tenant #4) access logical databases 211, 212, 213, 214 in a PostgreSQL database instance 210 (e.g., tenant #1 201 accesses logical database #1 211, etc. The logical database 211, 212, 213, 214 are separated from each other via database role boundaries 220 (illustrated by a dashed line in FIG. 2). A multi-tenant PostgreSQL server is a dedicated installation of the PostgreSQL database engine, which is owned by a software provider and shared among multiple consumers of the software. The provider application designates one logical database 211, 212, 213, 214 per consumer (e.g., per tenant 201, 202, 203, 204) and connects to the consumer-specific database based on the operation requested by the consumer. Ownership and management of the dedicated PostgreSQL instance is still the responsibility of the software provider. That is, aspects related to scaling, quotas, resource management, etc. may be handled by the software provider.

Figure 3:
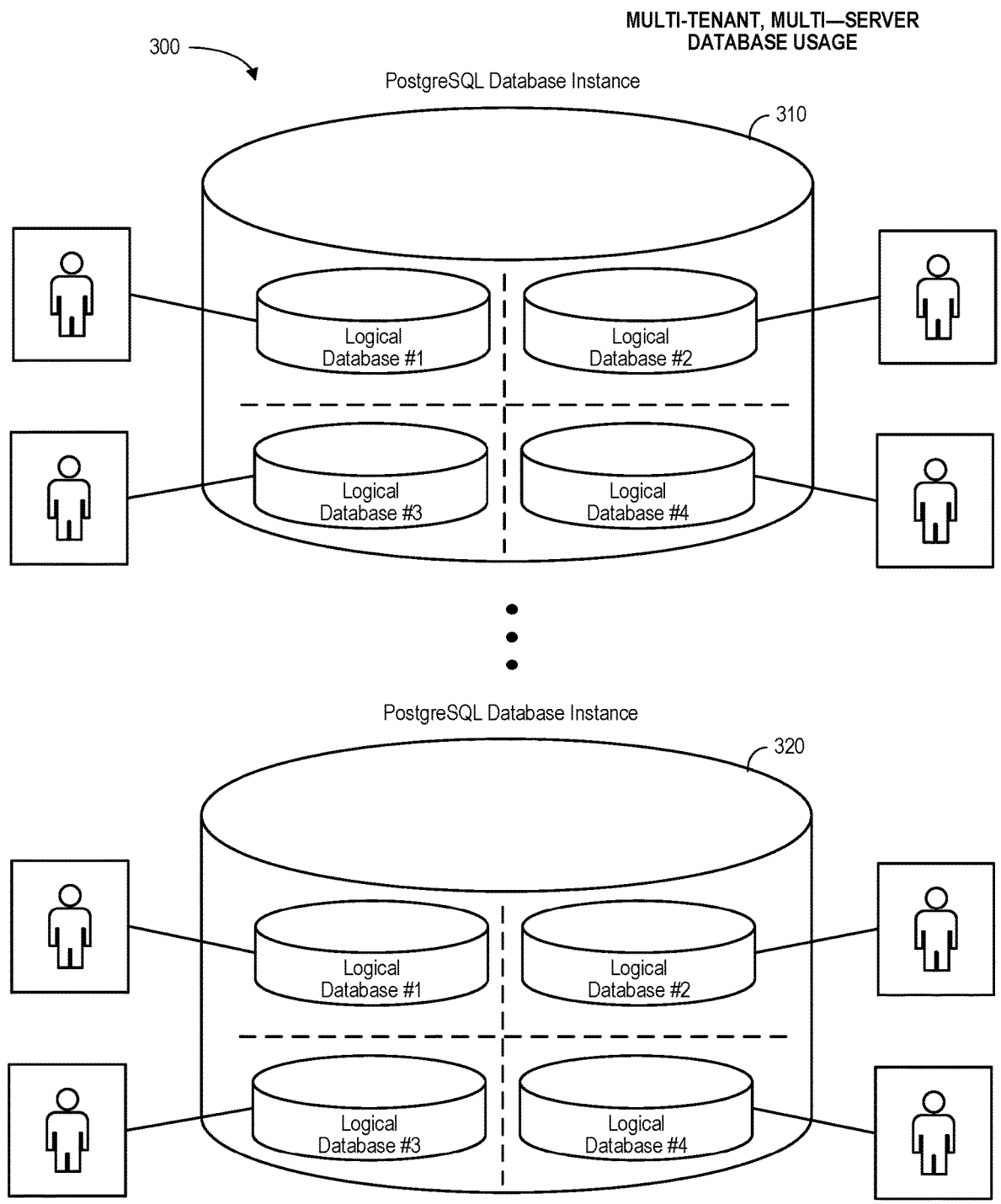
FIG. 3 illustrates multi-tenant, multi-server database usage.

FIG. 3 illustrates 300 multi-tenant, multi-server database usage. In this example, multiple PostgreSQL database instances 310, 320 have logical databases that are accessed by tenants. A multi-tenant multi-server PostgreSQL system is a fleet of dedicated PostgreSQL servers which consist of PostgreSQL logical databases with each logical database catering to a consumer tenant. Multiple applications (each representing a tenant) connect to a logical database of its own. Moreover, the logical databases could be scheduled to be inside any physical PostgreSQL server. This multi-tenant system eschews the concept of ownership of the physical instances by applications. Rather, the database system provider may be responsible for the orchestration of the physical servers and an allocation of logical databases (within the available resource limits of the PostgreSQL servers).

Figure 4:
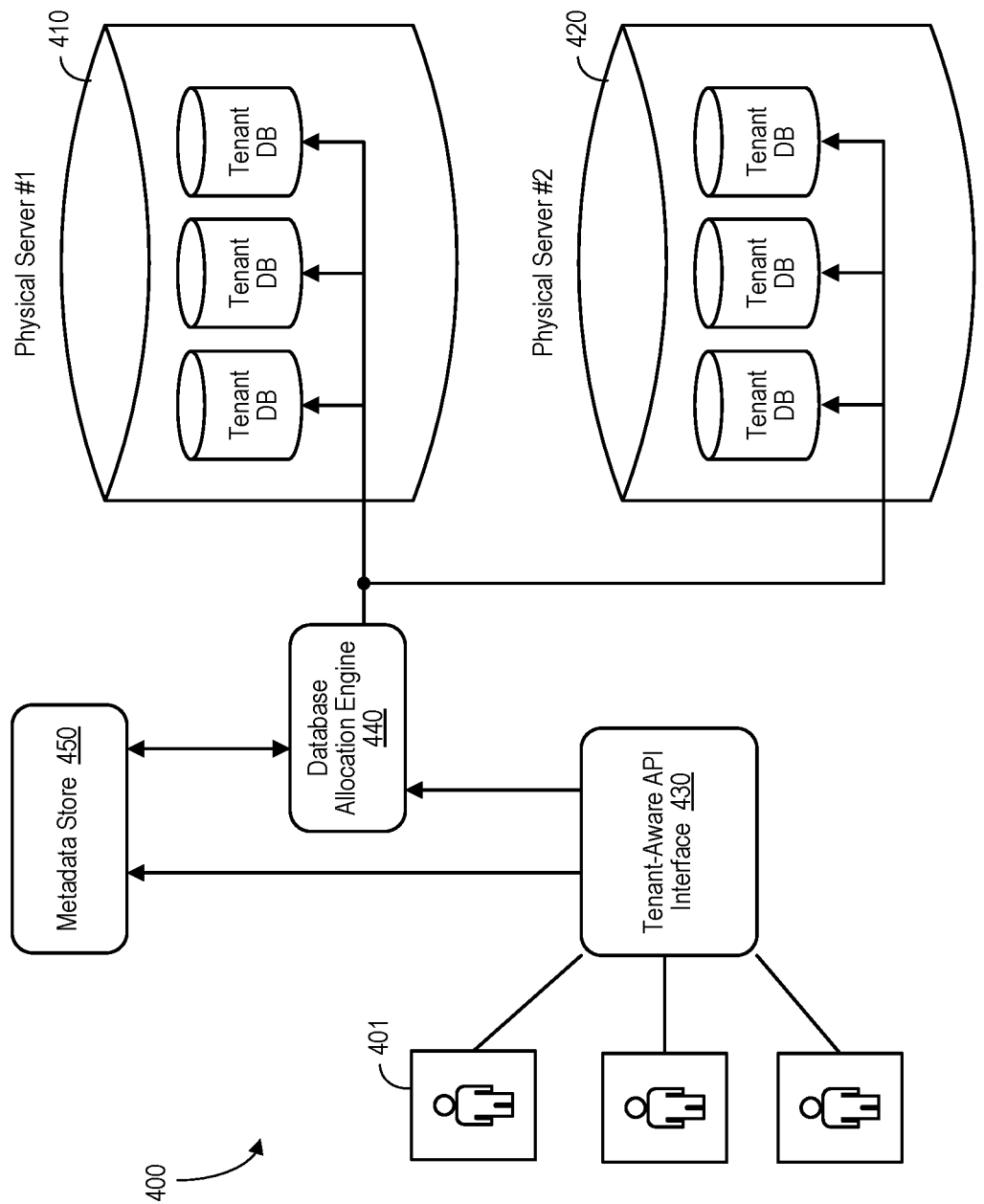
FIG. 4 is a high-level block diagram associated with a cloud-based computing system in accordance with some embodiments.

Embodiments described herein may provide a novel solution architecture and implementation design for a multi-tenant, multi-server PostgreSQL system (or other RDBMS). FIG. 4 is a high-level block diagram associated with a cloud-based computing system 400 in accordance with some embodiments. The system 400 may include a tenant-aware API interface 430 that receives requests from tenants 401 and communicates with a database allocation engine 440 and metadata store 450. Responsive to tenant requests, he database allocation engine 440 may automatically allocate tenant databases in physical servers 410, 420 as appropriate. As used herein, the term "automatically" may refer to a process that is performed with little or no human intervention.

As used herein, devices, including those associated with the system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The tenant aware API interface 430 and/or database allocation engine 440 may store information into and/or retrieve information from various data stores (e.g., database assignments), which may be locally stored or reside remote from the tenant aware API interface 430 and/or database allocation engine 440. Although a single tenant aware API interface 430 and database allocation engine 440 are shown in FIG. 4, any number of such devices may be included. Moreover, various devices described herein might be combined according to embodiments of the present invention. For example, in some embodiments, the tenant aware API interface 430 and database allocation engine 440 might comprise a single apparatus. The system 400 functions may be performed by a constellation of networked apparatuses, such as in a distributed processing or cloud-based architecture.

An administrator may access the system 400 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via the remote device (e.g., to define mappings or allocation rules) and/or provide or receive automatically generated recommendations or results associated with the system 400.

Figure 5:
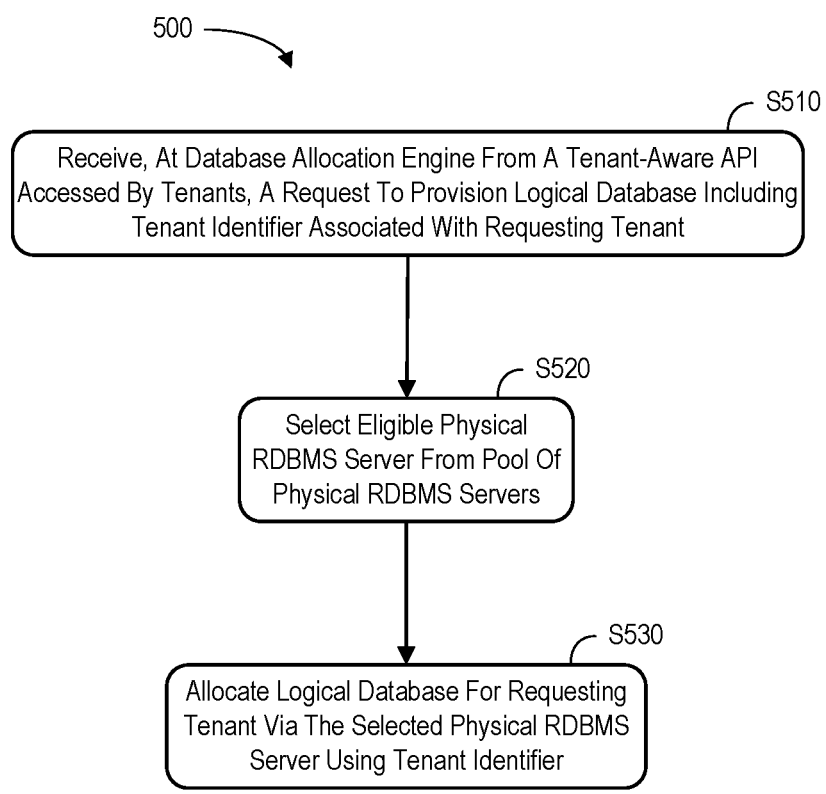
FIG. 5 is a fleet management method in accordance with some embodiments.

FIG. 5 is a fleet management method 500 that might be performed by some or all of the elements of the system 400 described with respect to FIG. 4. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, the system may receive, at a computer processor of a database allocation engine from a tenant-aware API accessed by tenants, a request to provision a logical database including a tenant identifier associated with a requesting tenant. At S520, the system may select an eligible physical RDBMS server from a pool of physical RDBMS servers. At S530, the system may allocate a logical database for the requesting tenant via the selected physical RDBMS server using the tenant identifier. In this way, embodiments may use native database constructs of a PostgreSQL engine to achieve secure isolation among tenants and reduce the Total Cost of Ownership ("TCO") for consumers.

Figure 6:
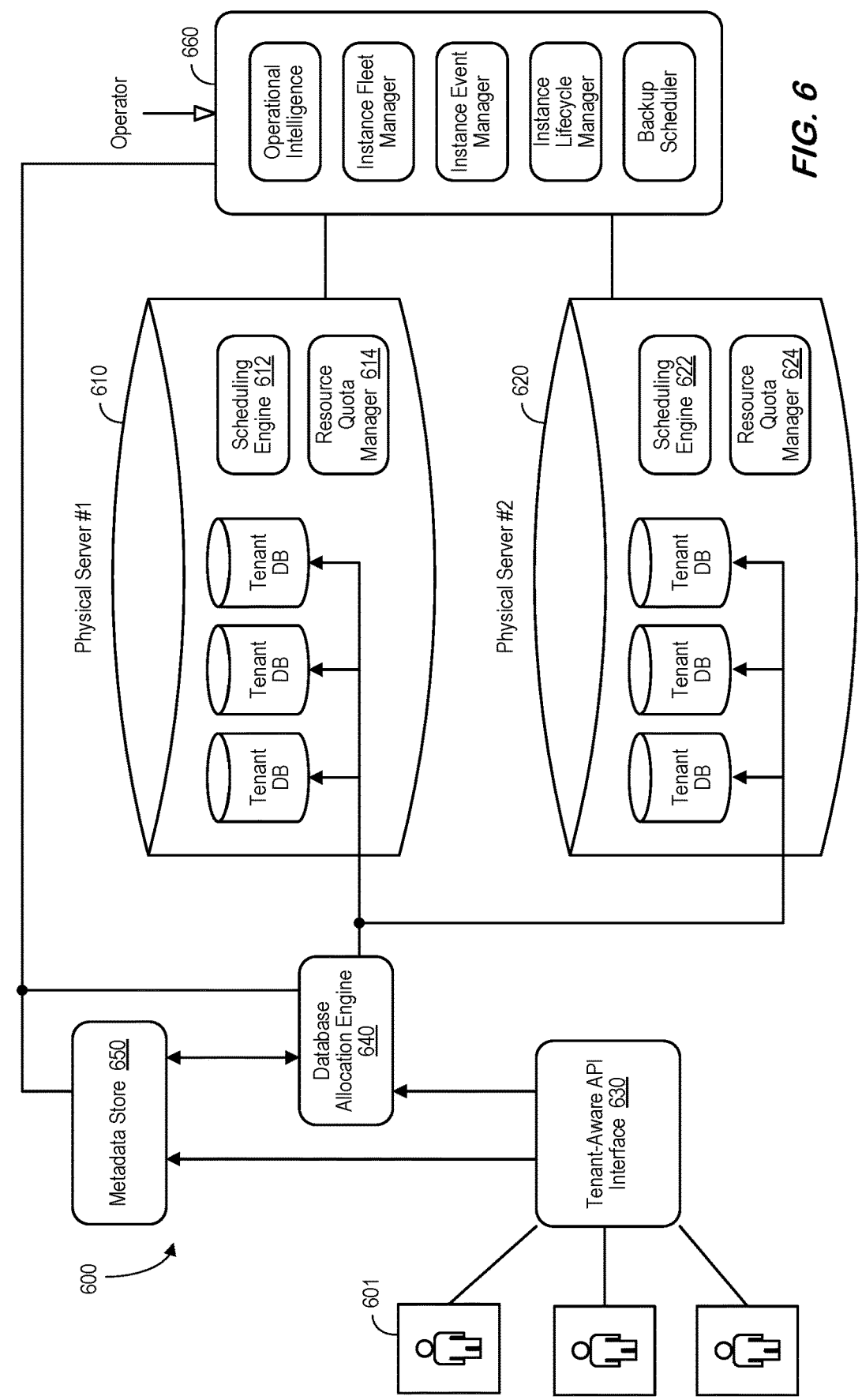
FIG. 6 is a multi-tenant, multi-server PostgreSQL system in accordance with some embodiments.

FIG. 6 is a multi-tenant, multi-server PostgreSQL system 600 in accordance with some embodiments. Multiple tenants 601 of the system 600 may access a tenant-aware Application Programming Interface ("API") interface 630. The tenant-aware API interface 630 may comprises a web-based API server organized around Representational State Transfer ("REST"). The REST APIs expose resource-oriented URLs with tenant 601 awareness and use standard HTTP response codes, authentication, and verbs. Tenant 601 awareness may be denoted using an arbitrary tenant identifier (which may conform to platform and/or system-provided guidelines).

For example, an API endpoint:
POST/api/v1/tenants/:id/databases
might provision a logical database for a provided tenant with optional scaling parameters. A request payload might comprise {"max_connections": <MAX_CONN_SIZE>}, a response status may comprise 201 CREATED, and a response payload may comprise:
{"status": "CREATED", "database": "<DB_NAME>", "host": "<DB_HOST>", "port": <DB_PORT>, "monitoring_endpoint": "<DB_MONITOR_HOST>"}.

Another API endpoint:
POST/api/v1/tenants/:id/databases/: dbname/connections
may provision and return connection credentials (in PostgreSQL driver format) for the tenant database. In this case, a response status may comprise 201 CREATED and a response payload may comprise:
{"id": "<CONNECTION ID>", "username": "<DB_USER>", "password": "<DB_PASSWORD>", "host": "<DB_HOST>", "port": <DB_PORT>}.

Still another API endpoint may comprise:
GET/api/v1/tenants/:id/databases/:dbname/connections/:connectionId
which returns the connection credentials for the provided tenant database connection. Here, a response status might comprise 200 OK and a response payload might comprise:
{"username": "<DB_USER>", "password": "<DB_PASSWORD>", "host": "<DB_HOST>", "port": <DB_PORT>}.

Yet another API endpoint might comprise:
DELETE/api/v1/tenants/:id/databases/:dbname/connections/:connectionId which deletes the connection credentials for the provided tenant database connection. In this case, a response status might comprise 200 OK and a response payload might could comprise {"status": "DELETED"}.

Another API endpoint might comprise:
DELETE/api/v1/tenants/:id/databases/:dbname
to delete the specified logical database for the tenant. This endpoint might have a response status of 200 OK and a response payload of {"status": "DELETED", "database": "<DB_NAME>"}.

The API interface 630 may act as a user-centric component and delegate actions against tenant databases to the database allocation engine 640. The database allocation engine 640 may comprise a non-web-based daemon application that listens for requests from the API interface 630. The allocation engine 640 may interact with a metadata store 650 and operational intelligence components 660 (e.g., including an instance fleet manager, an instance event manager, an instance lifecycle manager, a backup scheduler, etc.) to find the most eligible physical PostgreSQL server 610, 620 (each having tenant databases, a scheduling engines 612, 622, and a resource quota manager 614, 624) in the fleet and allocate a logical database to the request. The allocation engine 640 may also be responsible for returning an assigned tenant database to the API service to generate connection credentials.

Figure 7:
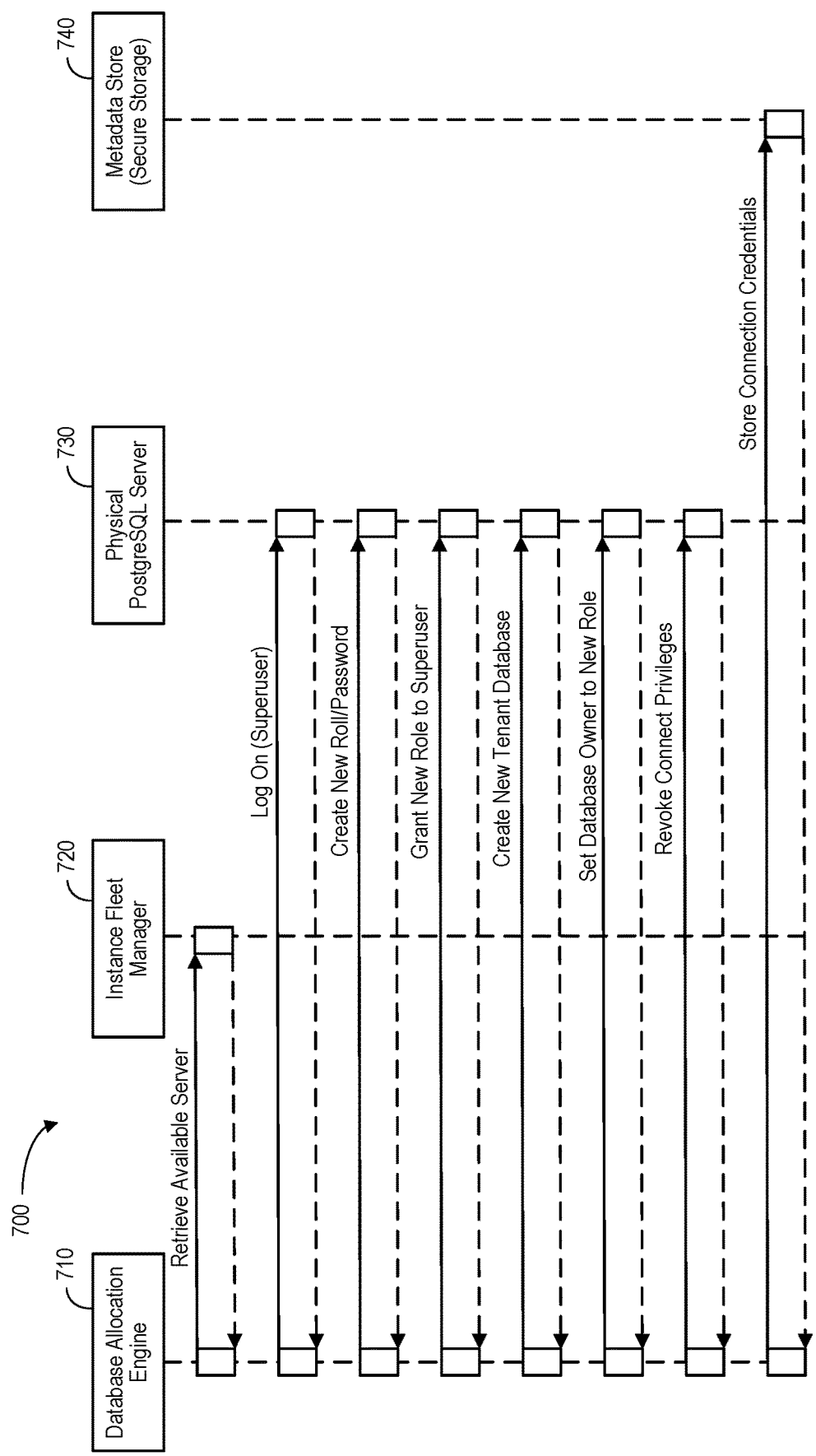
FIG. 7 is a role-based access control information flow according to some embodiments.

The database allocation engine 640 may enforce Role-Based Access Control ("RBAC") within the physical PostgreSQL servers 610, 620. According to some embodiments, the allocation engine 640 assigns logical databases and roles (also referred to as "users" in PostgreSQL terminology) which preclude access from other tenant databases within the same physical server 610, 620. FIG. 7 is a role-based access control information flow 700 according to some embodiments (e.g., showing the steps executed by an allocation engine 710 while provisioning a new tenant database. Initially, the allocation engine 710 retrieves an available server from an instance fleet manager 720. The database allocation engine 710 then logs onto a physical PostgreSQL server 730 as a superuser (e.g., and master or administrative user). Next, the database allocation engine 710 creates a new login role and password and grants the new role to the superuser via the physical PostgreSQL server 730. The database allocation engine 710 then creates a new tenant database and sets the database to the new role via physical PostgreSQL server 730. The database allocation engine 710 then revokes connect privileges from "public" via the physical PostgreSQL server 730 (to avoid allowing more privileges than are required). Finally, the database allocation engine 710 may store connection credentials in a metadata store 740 (e.g., in secure storage). Similarly, the database allocation engine may de-allocate and tear down the role and tenant database when a request is received for removal. The de-allocation process may remove all remnants of the login role and the logical database.

Figure 8:
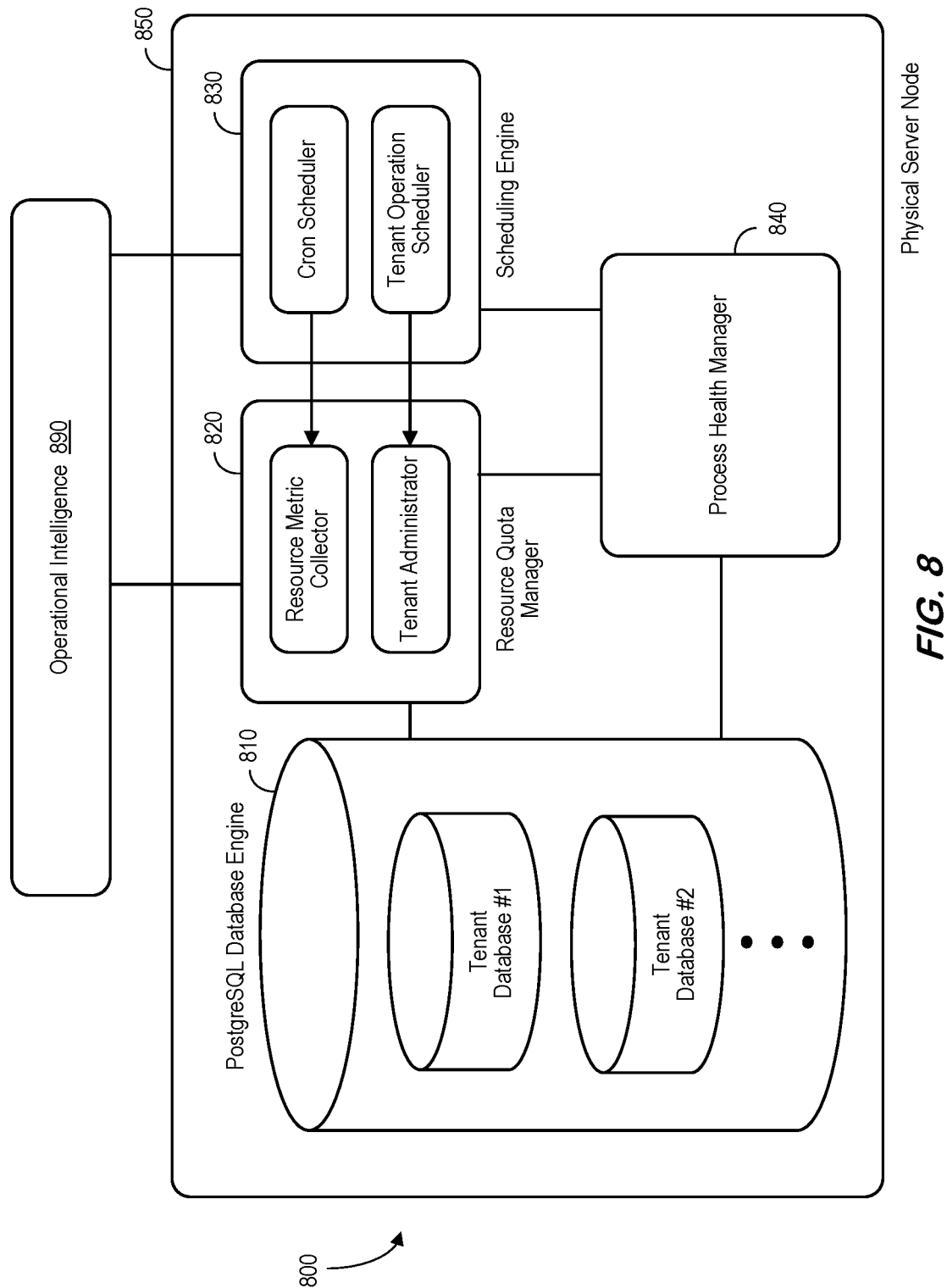
FIG. 8 illustrates processes and interaction associated with a physical server node in accordance with some embodiments.

FIG. 8 illustrates 800 processes and interaction associated with a physical server node 850 in accordance with some embodiments. A set of physical server nodes 850 may comprise a pool of hardware or virtual resources capable of running a PostgreSQL database engine 810 on each of them. The implementation enforces running only one PostgreSQL database engine 810 process per physical server node 850 to avoid resource starvation and increased allocation complexity. Nevertheless, each physical server node 850 may host multiple logical databases with each logical database hosting tenant-specific data. Operational intelligence 890 may communicate with a physical server node 850 that includes a PostgreSQL database engine 810, a resource quota manager 820 (e.g., including a resource metric collector and a tenant administrator), a scheduling engine 830 (e.g., including a cron scheduler and a tenant operation scheduler), and a process health manager 840. To achieve fine-grained control over the logical databases themselves, each physical server node 850 may be equipped with the process health manager 840 which is a daemon controller for both the database engine 810 and the control processes on the physical server nodes 850. Depending on the platform, the system might be deployed on (e.g., cloud providers such as AMAZON® Web Services ("AWS"), MICROSOFT® AZURE and GOOGLE® Cloud Platform ("GCP") or container orchestrators like Kubernetes or a bare-metal infrastructure), the process health manager 840 could be implemented as native operating system processes using utilities such as Monit or leveraging platform-provided constructs (e.g., probes). In general, the process health manager 840 may be responsible for the automated periodic monitoring, maintenance, and restoration of the node processes.

The resource quota manager 820 may comprise a core process which runs as a sidecar to the PostgreSQL database engine 810 process. The resource quota manager 820 might, according to some embodiments, perform the following:

execute SQL queries against internal views and functions targeting each logical database using a superuser connection role and gathers resource usage metrics corresponding to each tenant; and respond to signals from operational intelligence components to take preventive measures against specific tenant databases.

The default simplistic metric collected could, for example, be storage utilization for tenant databases using a query such as:

SELECT pg_size_pretty(pg_database_size ('<TENANT_DB>')).

The model may be extended to collect more resource metrics—for instance, the current count of active connections (also known as "backends" in PostgreSQL terminology) which might be collected using a query such as:

SELECT datname, numbackends from pg_stat_database.

Administrative actions against specific tenant databases might include, for example:

preventing further new connections to the tenant database;
short-circuiting existing connections to the tenant database (except superuser connections);
executing vacuum operations (garbage collector) against the tenant database to free storage blocks; and
executing administrative queries to database storage space.

The scheduling engine 830 may be another core process which runs as a sidecar to the PostgreSQL database engine 810 and resource quota manager 820 processes. The scheduling engine 830 might perform the following actions, according to some embodiments:

execute a cron schedule which regularly invokes the resource quota manager 820 to collect metrics for every tenant database; and receive signals from operational intelligence 890 components to tweak the schedule for specific tenants.

The scheduling engine 830 could be implemented as an embedded engine within the PostgreSQL process using an extension such as pg_cron or as a cron running as an operating system process. If the system deployment uses database servers provided by public cloud providers (such as an AMAZON® Relational Database Service or an AZURE® PostgreSQL service), the core processes cannot be deployed as sidecar processes running alongside the PostgreSQL engine (since these services abstract access to the virtual machines running the database and do not allow running arbitrary processes on the nodes). In these cases, the control processes could be deployed in machines hosted in a demilitarized network zone close to the physical PostgreSQL servers.

Figure 9:
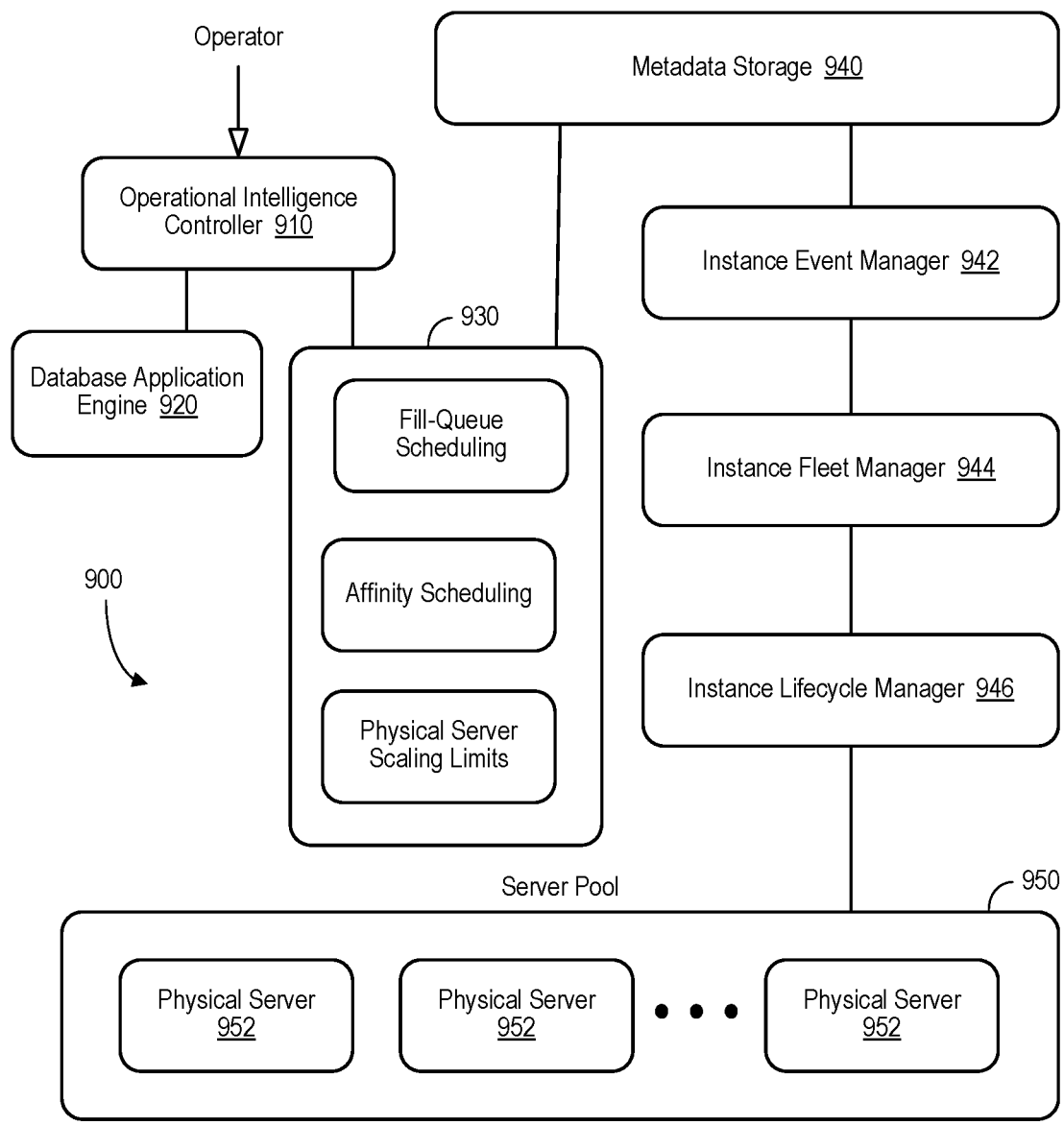
FIG. 9 includes components associated with operational intelligence according to some embodiments.

FIG. 9 includes components 900 associated with operational intelligence according to some embodiments. The components 900 include an operational intelligence controller 910 that implements an operator's instructions for a database application engine 920 and items 930 including fill-queue scheduling, affinity scheduling, and physical server scaling limits. Metadate storage 940 may interact with an instance event manager 942, an instance fleet manager 944, and an instance lifecycle manager 946 for a server pool 950 of physical servers 952. The components 900 may comprise a suite of applications which enable decisions in the allocation algorithm and policy engine for tenant databases within the physical servers 952. The operational intelligence controller 910 may be directed towards system operators and enables administrators or operators to perform the following:

tune the default system allocation algorithm for tenant databases;
tweak scheduling engine parameters for the physical servers 952;
tune backup schedules for specified logical databases and/or physical servers 952;
offline transition of allocated tenant databases to more eligible physical servers 952;
health checks for the physical servers 952; and
add or remove policy definitions for tenant database operations.

The operational intelligence controller 910 may comprise the brain of a multi-tenant, multi-server PostgreSQL system. The components 900 may be focused on operators to let them administer the system with fine-grained rules necessary for the deployment. The components 900 enable a few default constraint-oriented rules, such as a maximum number of tenant databases per physical server. This rule may define a static number of tenant databases per physical server, irrespective of resource utilization per tenant. If the operator switches on this rule, the component may:

signal the resource quota manager processes of each physical server node to preclude provisioning of new tenant databases if the number is reached; and
signals the instance fleet manager to provision new physical server nodes if a quorum of nodes has reached their limits.

The items 930 might also enable a physical server scaling limit that defines the scaling policy limit for provisioning new physical servers and allocate them to the server pool. The limit might be defined, for example, by a collection of flags and concrete values:

a flag 0 that indicates that the system must scale up if a percentage of physical nodes has reached their maximum limits. In this mode, the operator generally prefers existing nodes to be filled up before new resources are provisioned. As such, this may be a good option to save on costs.

a flag 1 that indicates that the system must scale up if the mean of overall system utilization has reached a defined threshold. In this mode, the component gathers and aggregates the resource utilization metrics of each physical server before applying the rule. In this mode, the operator favors tolerance on resource limits over costs generated by physical resources.

The items 930 might, according to some embodiments, enable fill-queue database scheduling that organizes available physical server 952 nodes in a virtual queue based on the timestamps at which the servers were created. It indicates to the database allocation engine 920 to fill up the servers 952 by allocating tenant databases in the order defined by the queue.

Other examples might include affinity-based scheduling that enables stickiness-based scheduling for logical tenant databases to only a specified set of physical servers 952. If this rule is switched on, operational intelligence prioritizes it over other database scheduling rules. This rule is usually switched on in rare scenarios by operators who wish to temporarily cordon off a set of physical servers 952. In some embodiments, a size-based scheduling deployment may provide differently sized logical databases for consumer tenants (to enable size-based database scheduling for tenant databases). This rule attempts to fit larger tenant databases into large enough physical servers 952 and fails allocations if the size constraints are not met.

According to some embodiments, the operational intelligence controller 910 can be extended to support custom policy-based scheduling. The component might be designed using extensibility in mind, and operators can build in new policies if the defaults do not suffice their deployment needs.

While scaling up nodes is a relatively "safer" operation, server evictions and scale-down processes are more involved procedures. Note that the scale-down procedure may be completely dependent on the scaling limits and database scheduling policies chosen by the operator. If the operator has chosen fill-queue scheduling, the evictions of existing physical servers can only proceed if there are server nodes without any allocated tenant database.

If an operator chooses to provide service plans for tenant databases, he or she can choose the behavior of the system 900 with respect to situations where the resource limits are met by individual tenants. The following defines certain behaviors that the system might undertake to enforce resource limits (and prevent over-consumption):

Prevention of TCP connections: If a tenant database has reached a threshold of allocated storage, this constraint prevents further connections to the database and forcibly kills existing connections. This constraint must be applied with caution because it typically leads to unfavorable user experience. However, it is probably a safe mechanism to administratively forbid "noisy tenants."

Prevention of write permissions: If a tenant database is deemed to have reached its allocated storage, this constraint removes write permissions from the tenant database role and retains only read-only permissions on the database. While this constraint improves user experience to a certain degree (because tenant consumers can still run SELECT queries against datasets), it could also disrupt normal operations for tenants. However, it is a relatively safe mechanism with sufficient tolerance for preventing noisy tenants.

Instance Event Manager 942: The instance event manager 942 is responsible for maintaining and responding to pre-defined events on physical server 952 nodes. Events can be administratively prohibited (e.g., during a resource crunch). The default events might include:

(1) Scale-up event: This is triggered by the operational intelligence controller 910 when the physical server scaling limits are reached. The event manager 942 forwards this event to the instance fleet manager 944, which delegates the request to the instance lifecycle manager 946 and tracks the progress of the instance provisioning request. Scaling events can be prohibited if the operational intelligence controller 910 sets the system to reject these.

(2) Backup event: This is triggered by the backup scheduler. Usually, full backups of the physical server 952 storage media are triggered on a pre-defined operational schedule and involve disk-based snapshots of all physical servers 952 in the server pool 950. The event manager 942 forwards this event to the instance fleet manager 944, which distributes the backup requests to all available physical server 952 nodes.

(3) Restore event: This is triggered on-demand by an operator in the case of a disaster or untoward circumstances. The event is generated by the operational intelligence controller 910 and propagated to the event manager 942. The event manager 942 transforms the event to a payload understandable by the fleet manager 944 and delegates recovery of the target server node.

According to some embodiments, the instance event manager 942 audits each event for posterity and compliance.

The instance fleet manager 944 is a controller process that dispatches and executes requests for operations related to the physical server 952 nodes. The fleet manager 944 uses the metadata storage 940 to maintain information about the current physical servers 952 in the server pool.

The fleet manager 944 delegates requests for scale-up operations to the instance lifecycle manager 946 and tracks the progress of the scale-up operations. It signals the operational intelligence controller 910 when the created server 952 has successfully joined the server pool 950 and indicates that the server 952 is ready to accept tenant databases. On the other hand, the fleet manager 944 is responsible for distributing requests for triggering backups on all the pooled servers 952. The instance lifecycle manager 946 is a controller process which dispatches requests for provisioning new physical servers 952 to the infrastructure. This component interfaces with infrastructure and/or hypervisor APIs to coordinate lifecycle management of the physical servers 952. The server lifecycle manager 946 delegates to cloud provider APIs (e.g., AWS®, AZURE®, and GCP® APIs) if the system is deployed on a cloud provider or uses Kubernetes operators. The lifecycle manager 946 delegates custom resources if the system is deployed on a Kubernetes platform or uses proprietary APIs provided by the bare-metal infrastructure (if the system is deployed on proprietary infrastructure).

Figure 10:
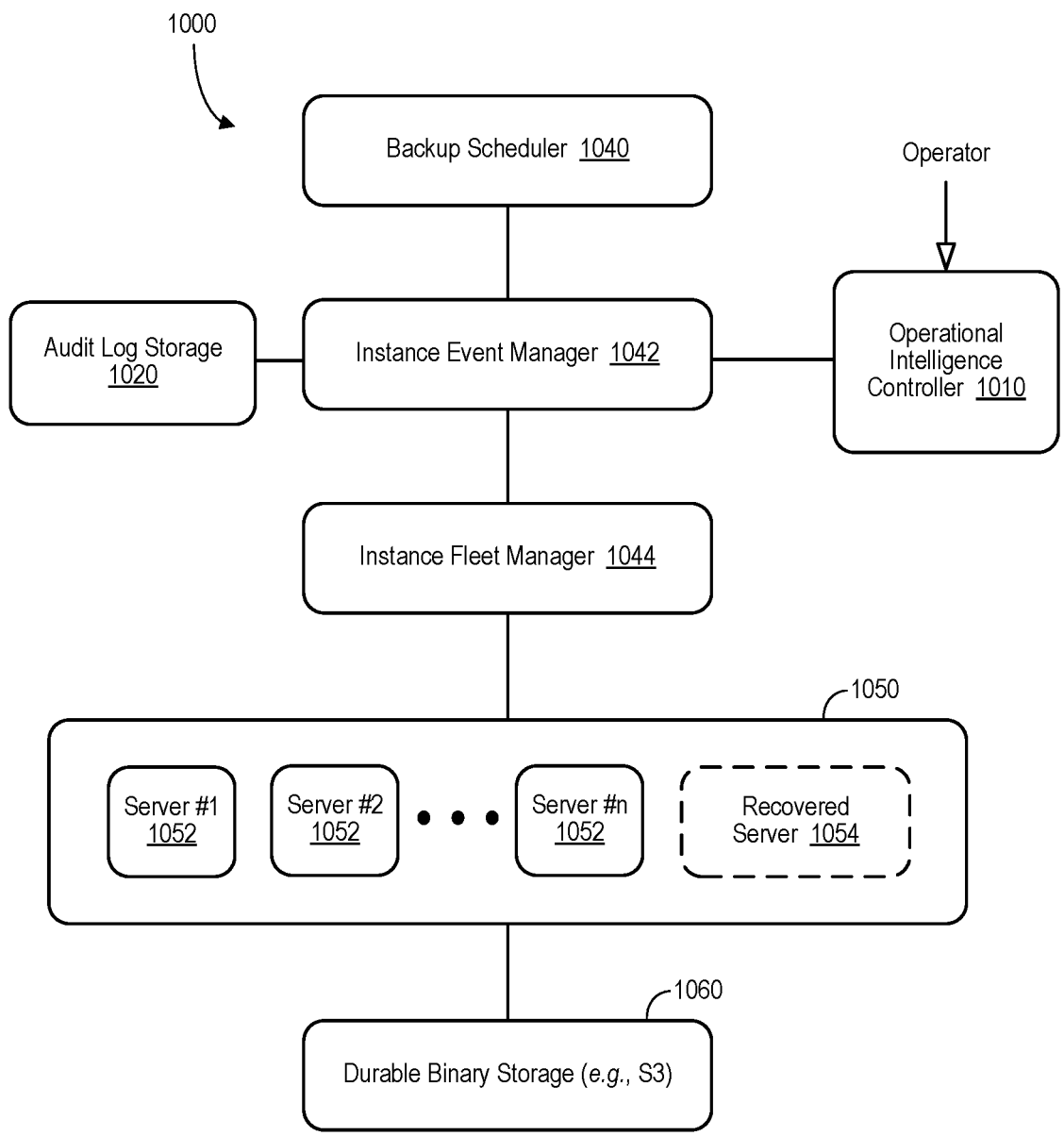
FIG. 10 illustrates backup and recovery components in accordance with some embodiments.

FIG. 10 illustrates 1000 backup and recovery components in accordance with some embodiments. An instance event manager 1042 communicates with a backup scheduler 1040, audit log storage 1020, an operational intelligence controller 1010, and an instance fleet manager 1044. The instance fleet manager 1044 also communicates with a pool 1050 of servers 1052 (including a recovered server 1054) that accesses durable binary storage 1060 (e.g., AMAZON® Simple Storage Service ("S3")). The backup scheduler 1040 is responsible for triggering full backups of the physical PostgreSQL servers 1052 on a scheduled basis. Backups can be triggered using infrastructure-provided APIs (e.g., cloud provider APIs) or using PostgreSQL-native features such as pgBackRest.

Note that full backups may be triggered for the attached disks of the physical server 1052 nodes, and they are configured to be stored reliably in a durable storage medium (such as binary storage containers). Backup archives of the tenant databases are expected to be extracted on-demand by the consumers using PostgreSQL-native features (e.g., pg_dump). Recovery of physical servers 1052 may be triggered by the operator via the operational intelligence controller 1010. After the physical server 1054 is recovered, the original server might need to be evicted or cordoned off.

In this way, embodiments may provide an automated infrastructure-agnostic approach to manage fleets of tenant-oriented logical RDBMS databases across physical servers.

Figure 11:
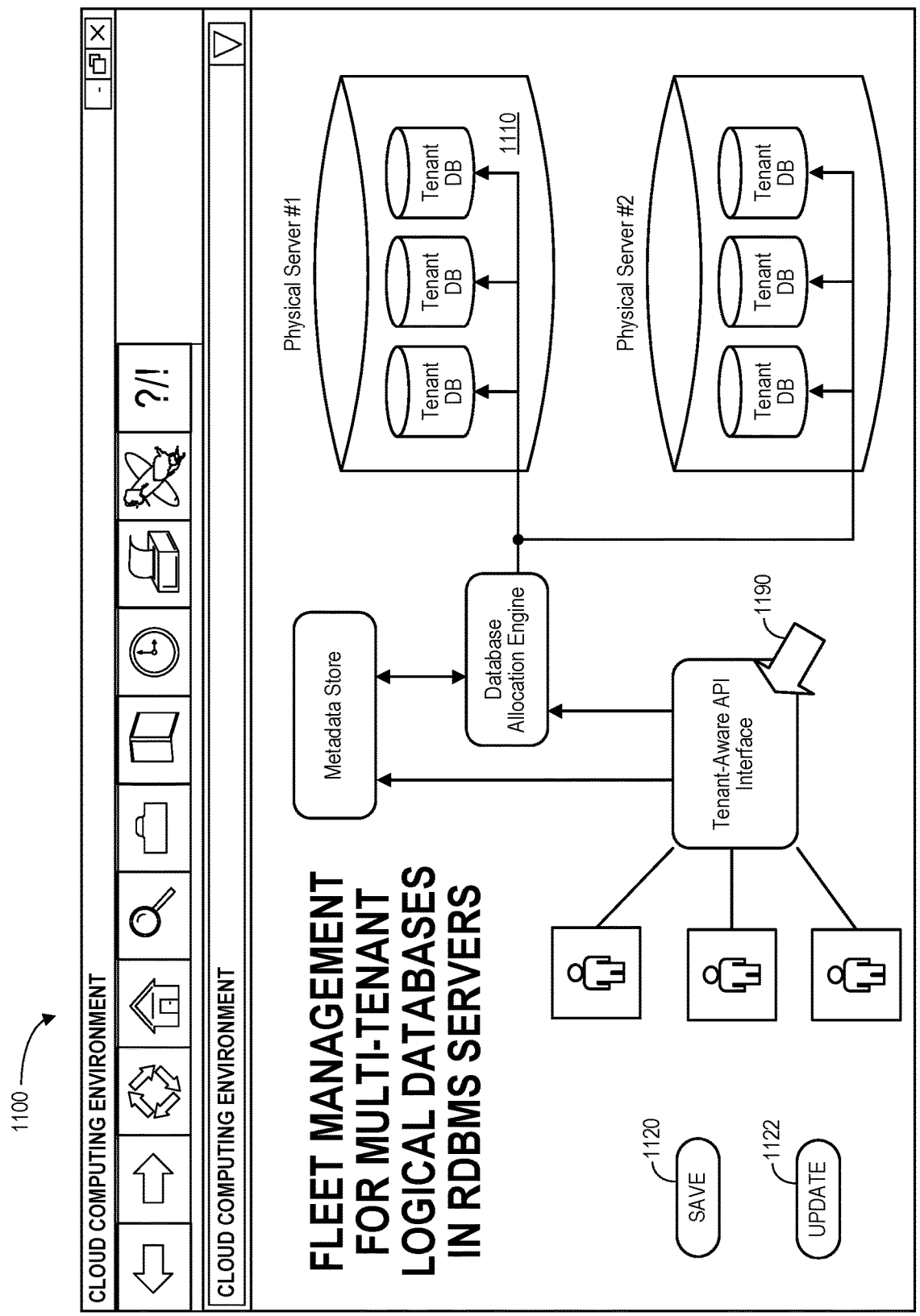
FIG. 11 is a fleet management display according to some embodiments.

FIG. 11 is a fleet management display 1100 according to some embodiments. The display 1100 includes a graphical representation 1110 or dashboard that might be used to manage fleets of RDBMS databases across physical servers (e.g., for a multi-tenant cloud computing environment). In particular, selection of an element (e.g., via a touchscreen or computer mouse pointer 1190) might result in the display of a popup window that contains more detailed data. The display 1100 may also include a user selectable "Save" icon 1120 to store configurations and/or system mappings (e.g., to a particular metadata store) and an "Update" icon 1122 to adjust values as appropriate.

Figure 12:
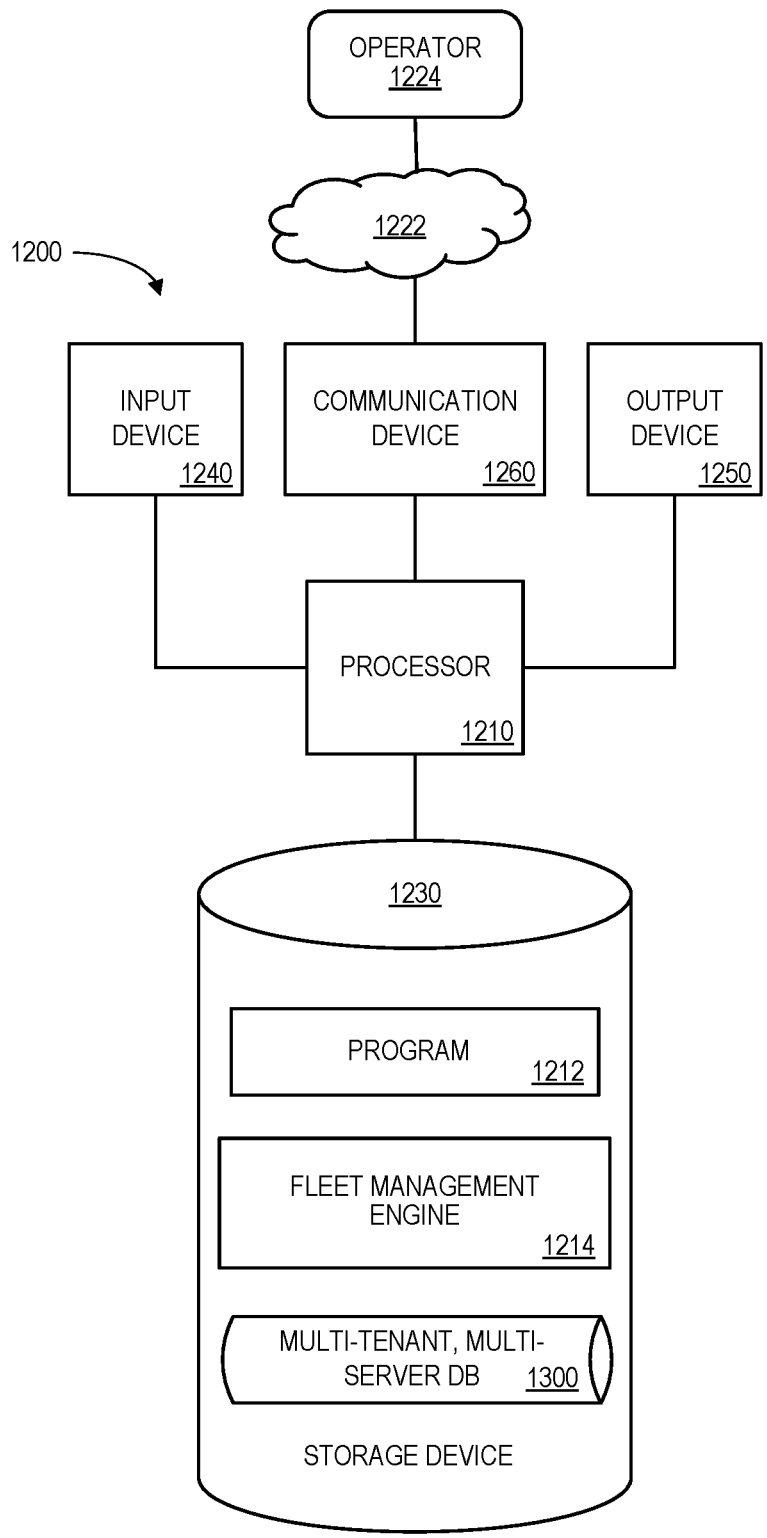
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the systems 400, 600 of FIGS. 4 and 6, respectively (and/or any other system described herein). The platform 1200 comprises a processor 1210, such as one or more commercially available Central Processing Units ("CPUs") in the form of one-chip microprocessors, coupled to a communication device 1260 configured to communicate via a communication network (not shown in FIG. 12). The communication device 1260 may be used to communicate, for example, with one or more developers 1224 (e.g., via a communication network 1222), system administrators, etc. The platform 1200 further includes an input device 1240 (e.g., a computer mouse and/or keyboard to input, create and/or manage fleet information) and/or output device 1250 (e.g., a computer monitor to render a display, transmit recommendations, and/or create reports about fleets, physical servers, logical databases, etc.). According to some embodiments, a mobile device and/or PC may be used to exchange information with the platform 1200.

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or fleet management engine 1214 for controlling the processor 1210. The processor 1210 performs instructions of the programs 1212, 1214, and thereby operates in accordance with any of the embodiments described herein. For example, the processor 1210 may receive, from a tenant-aware API, a request to provision a logical database including a tenant identifier associated with a requesting tenant. The processor 1210 may then select an eligible physical RDBMS server in a pool of physical RDBMS servers and allocate a logical database for the requesting tenant via the selected physical RDBMS server (e.g., using the tenant identifier).

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores a multi-tenant, multi-server database 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein.

Figure 13:
FIG. 13 is a tabular portion of a multi-tenant, multi-server database in accordance with some embodiments.

Referring to FIG. 13, a table is shown that represents the multi-tenant, multi-server database 1300 that may be stored at the platform 1200 according to some embodiments. The table may include, for example, entries identifying tenant requests for database allocations in a cloud computing environment. The table may also define fields 1302, 1304, 1306, 1308, 1310 for each of the entries. The fields 1302, 1304, 1306, 1308, 1310 may, according to some embodiments, specify a request identifier 1302, a tenant identifier 1304, a physical RDBMS server 1306, an allocated logical database 1308, and a status 1310. The multi-tenant, multi-server database 1300 may be created and updated, for example, when requests are received from tenants, databases are allocated or deleted, etc.

The request identifier 1302 might be a unique alphanumeric label that is associated with a request received from a tenant-aware API. The tenant identifier 1304 might identify the customer or tenant who submitted the request. The physical RDBMS server 1306 might indicate, for example, a particular PostgreSQL server that was selected in response to the request. The allocated logical database 1308 might indicate a database to be used by the tenant. The status 1310 might indicate that a request is in process, has been allocated, a database has been deleted, etc.

Thus, embodiments may provide several benefits for both database providers and software providers. For example, database providers may benefit from a reduced total cost of ownership, better utilization of physical resources, extensive service plans for cloud-based tryout scenarios, an easier provisioning for ensuring compliance, etc. Software providers may benefit from easier end-user maintenance, simplified CI pipelines, cost-effective usage-based pricing models, decoupled compliance-related operations, etc.

Figure 14:
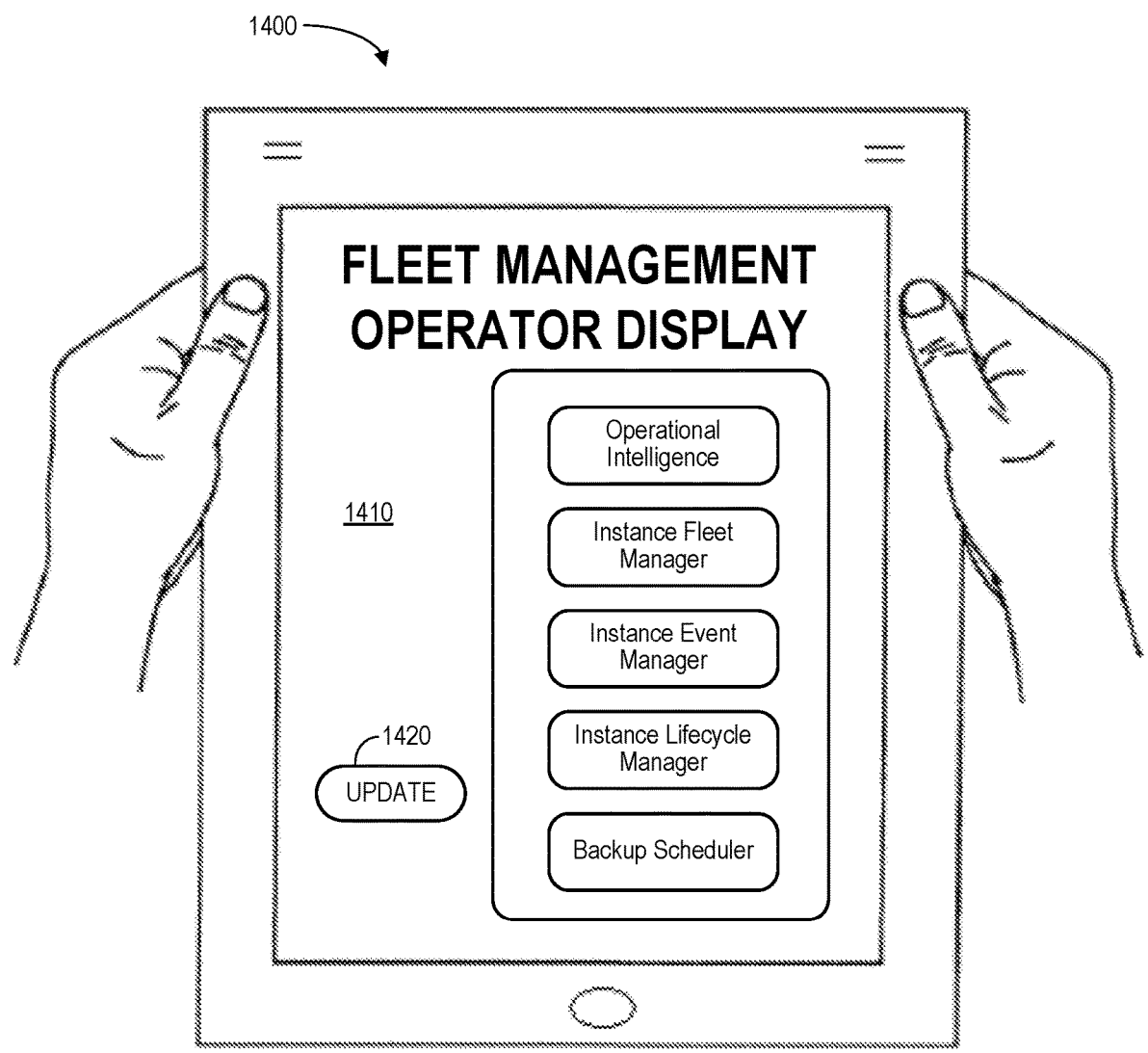
FIG. 14 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of APIs, database allocation engines, operational intelligence, etc., any of the embodiments described herein could be applied to other designs. Moreover, the displays shown herein are provided only as examples, and any other type of user interface could be implemented. For example, FIG. 14 illustrates a tablet computer 1400 providing a fleet management operator display 1410 according to some embodiments. The display 1410 might be used, for example, to enter allocation rules or limits for a cloud computing environment. Moreover, the display 1410 might be used to update and/or create backups, events, lifecycle parameters via an "Update" icon 1420.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to manage a fleet of multi-tenant logical databases in Relational Database Management System ("RDBMS") servers for a cloud computing environment, comprising:
   a pool of physical RDBMS servers;
   a tenant-aware Application Programming Interface ("API") accessed by tenants; and
   a database allocation engine, including:
      a computer processor, and
      a computer memory storing instructions that, when executed by the computer processor, cause the database allocation engine to:
         receive, from the tenant-aware API, a request to provision a logical database including a tenant identifier associated with a requesting tenant,
         select an eligible physical RDBMS server in the pool of physical RDBMS servers, and
         allocate a logical database for the requesting tenant via the selected physical RDBMS server using the tenant identifier,
   wherein operational intelligence implements a constraint-oriented rule including a maximum number of tenant databases per physical RDBMS server and a multi-mode physical RDBMS server scaling limit, including a first mode in which the database allocation engine scales up if a percentage of physical nodes has reached a maximum limit and a second mode in which the database allocation engine scales up if a mean of overall system utilization has reached a defined threshold.

2. The system of claim 1, wherein the selected physical RDBMS server hosts multiple logical databases for multiple tenants.

3. The system of claim 1, wherein the database allocation engine enforces Role-Based Access Control ("RBAC") for physical RDBMS servers to preclude access to the allocated logical database by other tenants.

4. The system of claim 1, wherein the physical RDBMS servers comprise Postgre-Structured Query Language ("SQL") servers.

5. The system of claim 1, wherein the allocated logical database is associated with a physical server node having a resource quota manager to gather resource usage metrics associated with tenants.

6. The system of claim 1, wherein the allocated logical database is associated with a physical server node having a process health manager for automatic monitoring, maintenance, and restoration of node processes.

7. The system of claim 1, wherein the allocated logical database is associated with operational intelligence to perform all of the following: (i) tune a default system allocation algorithm for tenant databases; (ii) tweak scheduling engine parameters for the physical RDBMS servers; (iii) tune backup schedules for specified logical databases; (iv) execute an offline transition of allocated tenant databases to more eligible physical RDBMS servers; (v) perform health checks for the physical RDBMS servers; and (vi) add or remove policy definitions for tenant database operations.

8. The system of claim 1, wherein the constraint-oriented rule further comprises: (i) fill-queue database scheduling, (ii) affinity-based scheduling, and (iii) size-based scheduling.

9. A computer-implemented method to manage a fleet of multi-tenant logical databases in Relational Database Management System ("RDBMS") servers for a cloud computing environment, comprising:
   receiving, at a computer processor of a database allocation engine from a tenant-aware Application Programming Interface ("API") accessed by tenants, a request to provision a logical database including a tenant identifier associated with a requesting tenant;
   selecting an eligible physical RDBMS server from a pool of physical RDBMS servers; and
   allocating a logical database for the requesting tenant via the selected physical RDBMS server using the tenant identifier,
   wherein operational intelligence implements a constraint-oriented rule including a maximum number of tenant databases per physical RDBMS server and a multi-mode physical RDBMS server scaling limit, including a first mode in which the database allocation engine scales up if a percentage of physical nodes has reached a maximum limit and a second mode in which the database allocation engine scales up if a mean of overall system utilization has reached a defined threshold.

10. The method of claim 9, wherein the selected physical RDBMS server hosts multiple logical databases for multiple tenants.

11. The method of claim 10, wherein the database allocation engine enforces Role-Based Access Control ("RBAC") for physical RDBMS servers to preclude access to the allocated logical database by other tenants.

12. The method of claim 9, wherein the physical RDBMS servers comprise Postgre Structured Query Language ("SQL") servers.

13. The method of claim 9, wherein the allocated logical database is associated with a physical server node having a resource quota manager to gather resource usage metrics associated with tenants.

14. The method of claim 9, wherein the allocated logical database is associated with a physical server node having a process health manager for automatic monitoring, maintenance, and restoration of node processes.

15. The method of claim 9, wherein the allocated logical database is associated with operational intelligence to perform all of the following: (i) tune a default system allocation algorithm for tenant databases; (ii) tweak scheduling engine parameters for the physical RDBMS servers; (iii) tune backup schedules for specified logical databases; (iv) execute an offline transition of allocated tenant databases to more eligible physical RDBMS servers; (v) perform health checks for the physical RDBMS servers; and (vi) add or remove policy definitions for tenant database operations.

16. The method of claim 9, wherein the constraint-oriented rule further comprises: (i) fill-queue database scheduling, (ii) affinity-based scheduling, and (iii) size-based scheduling.

17. A non-transitory, computer-readable medium storing instructions, that, when executed by a processor, cause the processor to perform a method to manage a fleet of multi-tenant logical databases in Relational Database Management System ("RDBMS") servers for a cloud computing environment, the method comprising:
   receiving, at a computer processor of a database allocation engine from a tenant-aware Application Programming Interface ("API") accessed by tenants, a request to provision a logical database including a tenant identifier associated with a requesting tenant;

selecting an eligible physical RDBMS server from a pool of physical RDBMS servers; and allocating a logical database for the requesting tenant via the selected physical RDBMS server using the tenant identifier, wherein operational intelligence implements a constraint-oriented rule including a maximum number of tenant databases per physical RDBMS server and a multi-mode physical RDBMS server scaling limit, including a first mode in which the database allocation engine scales up if a percentage of physical nodes has reached a maximum limit and a second mode in which the database allocation engine scales up if a mean of overall system utilization has reached a defined threshold.

18. The medium of claim 17, wherein the selected physical RDBMS server hosts multiple logical databases for multiple tenants.

19. The medium of claim 18, wherein the database allocation engine enforces Role-Based Access Control ("RBAC") for physical RDBMS servers to preclude access to the allocated logical database by other tenants.

20. The medium of claim 17, wherein the physical RDBMS servers comprise Postgre Structured Query Language ("SQL") servers.

* * * * *